United States Patent
Prasad et al.

(10) Patent No.: US 10,831,448 B2
(45) Date of Patent: Nov. 10, 2020

(54) AUTOMATED PROCESS ANALYSIS AND AUTOMATION IMPLEMENTATION

(71) Applicant: Accenture Global Solutions Limited, Dublin (IE)

(72) Inventors: Rajendra T. Prasad, Bangalore (IN); Bhaskar Ghosh, Bengaluru (IN); Mohan Sekhar, Bangalore (IN); Priya Athreyee, Chennai (IN); Koustuv Jana, Bangalore (IN); Koushik Vijayaraghavan, Chennai (IN); Amaresh Swain, Hyderabad (IN); Pradeep Senapati, Bangalore (IN); Kamakshi Girish, Bangalore (IN); Lakshmi Narasimhan, Bangalore (IN); Somen Roy, Bangalore (IN); Rajesh Nagarajan, Chennai (IN); Senthil Jeyachandran, Chennai (IN); Arulmozhi Dharmar, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/376,693

(22) Filed: Apr. 5, 2019

(65) Prior Publication Data

US 2020/0073639 A1 Mar. 5, 2020

(30) Foreign Application Priority Data

Aug. 30, 2018 (IN) .............................. 201841032619

(51) Int. Cl.
*G06F 9/44* (2018.01)
*G06F 8/10* (2018.01)
(Continued)

(52) U.S. Cl.
CPC ................ *G06F 8/10* (2013.01); *G06F 40/40* (2020.01); *G06N 20/00* (2019.01)

(58) Field of Classification Search
CPC ............ G06F 8/10; G06F 40/30; G06F 40/40; G06N 20/00; G06N 20/10; G06N 5/041;
(Continued)

(56) References Cited

U.S. PATENT DOCUMENTS

| | | | |
|---|---|---|---|
| 2006/0026054 A1* | 2/2006 | Barel ............... | G06Q 10/06375 705/7.37 |
| 2012/0047000 A1* | 2/2012 | O'Shea ................ | G06Q 10/063 705/7.42 |

(Continued)

*Primary Examiner* — Lewis A Bullock, Jr.
*Assistant Examiner* — Tina Huynh
(74) *Attorney, Agent, or Firm* — Harrity & Harrity, LLP

(57) ABSTRACT

A device may obtain process data relating to a set of processes. The device may process the process data to generate a process analysis model. The device may classify, using the process analysis model, a particular process into a particular class of a set of classes of the process analysis model. The device may automatically assess the particular process based on the particular class, wherein a set of assessment parameters for assessing the particular process is selected based on the particular class, and wherein an assessment score is assigned to the particular process based on values for the set of assessment parameters. The device may determine, based on the assessment score and the particular class, an automation recommendation for the particular process. The device may automatically complete the particular process using a particular tool based on determining the automation recommendation.

20 Claims, 9 Drawing Sheets

(51) Int. Cl.
 *G06N 20/00* (2019.01)
 *G06F 40/40* (2020.01)
(58) Field of Classification Search
 CPC .......... G06N 5/02; G06N 3/088; G06N 7/005; G06Q 50/00
 See application file for complete search history.

(56) References Cited

U.S. PATENT DOCUMENTS

| | | | |
|---|---|---|---|
| 2012/0136695 A1* | 5/2012 | Bagheri | G06Q 10/063 705/7.28 |
| 2013/0268260 A1* | 10/2013 | Lundberg | G06F 16/90332 704/8 |
| 2018/0157641 A1* | 6/2018 | Byron | G06N 5/041 |
| 2018/0246883 A1* | 8/2018 | Wang | G06N 5/045 |

\* cited by examiner

Process Assessment User Interface

Submit

Process Classification

Process Scope: Application Management

Process Areas: Service Level Management, Knowledge Management, Risk Management, Estimation and Budgeting

Questionnaire

Incidents are identified by support groups?
Response: Agree Strongly / *Agree Somewhat* / Disagree / Not Relevant Comments:
EVENT MONITORING IS DONE USING AN APPLICATION FOR SYSTEM ANOMALY IDENTIFICATION, WHICH NOTIFIES SUPPORT PERSONNEL. HOWEVER THERE IS NO PROCESS IN PLACE FOR MONITORING APPLICATION HEALTH.....

AUTOMATED PROCESS ANALYSIS AND AUTOMATION IMPLEMENTATION

RELATED APPLICATION

This application claims priority under 35 U.S.C. § 119 to Indian Patent Application No. 201841032619, filed on Aug. 30, 2018, the content of which is incorporated by reference herein in its entirety.

BACKGROUND

Software development is an ongoing process that includes multiple phases. For example, software development may include a requirements gathering phase, a code authoring phase, a code testing phase, a code deployment phase, a usage management and ticket resolution phase, and/or the like. Some tools may be developed that automate portions of a particular software development project. For example, a tool may be developed that automatically resolves a particular type of ticket for a particular project. A project manager may assess a process associated with a project, and may deploy a tool to complete the process associated with the project.

SUMMARY

According to some possible implementations, a device may include one or more memories, and one or more processors, communicatively coupled to the one or more memories, to obtain process data relating to a set of processes. The one or more processors may process the process data to generate a process analysis model. The one or more processors may classify, using the process analysis model, a particular process into a particular class of a set of classes of the process analysis model. The one or more processors may automatically assess the particular process based on the particular class, wherein a set of assessment parameters for assessing the particular process is selected based on the particular class, and wherein an assessment score is assigned to the particular process based on values for the set of assessment parameters. The one or more processors may determine, based on the assessment score and the particular class, an automation recommendation for the particular process, wherein the automation recommendation identifies a particular tool, of a set of tools, for completing the particular process. The one or more processors may automatically complete the particular process using the particular tool based on determining the automation recommendation.

A method may include obtaining, by a device, process data relating to a set of processes. The method may include processing, by the device, the process data to generate a process analysis model. The method may include determining, by the device and based on the process analysis model, an automation recommendation for a particular process, wherein a set of assessment parameters for assessing the particular process is selected based on a particular class of the particular process determined based on the process analysis model, wherein an assessment score is assigned to the particular process based on values for the set of assessment parameters, and wherein the automation recommendation identifies a particular tool, of a set of tools, for completing the particular process selected based on the assessment score. The method may include automatically completing, by the device, the particular process using the particular tool based on determining the automation recommendation.

A non-transitory computer-readable medium storing instructions. The instructions may comprise one or more instructions that, when executed by one or more processors, cause the one or more processors to receive a request to generate an automation recommendation for a particular process. The instructions may comprise one or more instructions that, when executed by one or more processors, cause the one or more processors to classify, using a process analysis model, the particular process into a particular class of a set of classes of the process analysis model. The instructions may comprise one or more instructions that, when executed by one or more processors, cause the one or more processors to automatically assess the particular process based on the particular class, wherein a set of assessment parameters for assessing the particular process is selected based on the particular class, and wherein an assessment score is assigned to the particular process based on values for the set of assessment parameters. The instructions may comprise one or more instructions that, when executed by one or more processors, cause the one or more processors to determine, based on the assessment score and the particular class, the automation recommendation for the particular process, wherein the automation recommendation identifies a particular tool, of a set of tools, for completing the particular process. The instructions may comprise one or more instructions that, when executed by one or more processors, cause the one or more processors to provide information identifying the automation recommendation.

BRIEF DESCRIPTION OF THE DRAWINGS

FIGS. 1A-1D are diagrams of an example implementation described herein.

DETAILED DESCRIPTION

Figure 1A:
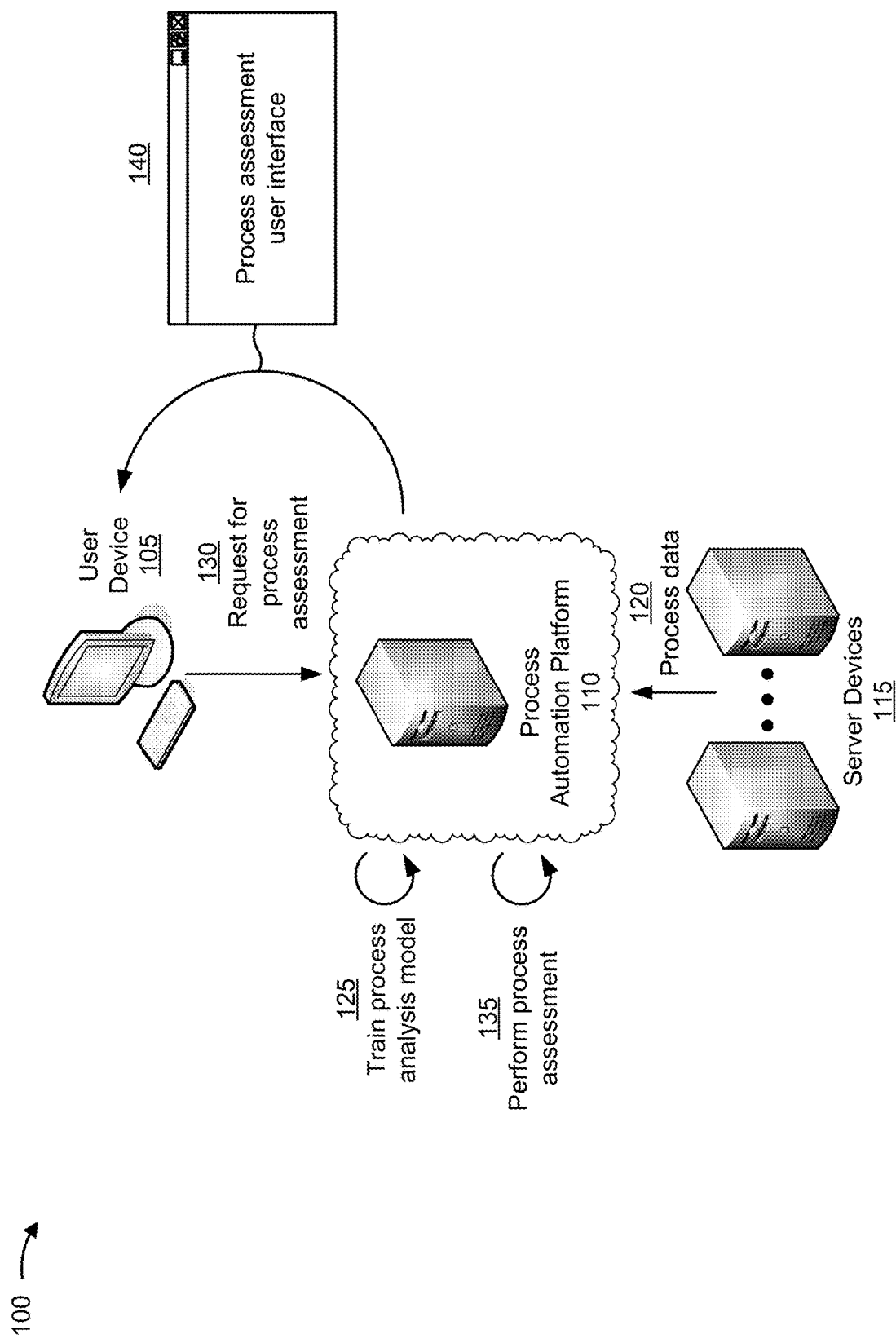

The following detailed description of example implementations refers to the accompanying drawings. The same reference numbers in different drawings may identify the same or similar elements.

Different processes may be used to complete different projects. For example, software developers may complete software development tasks of a software development project relating to an agile delivery process. In some cases, completing tasks with human intervention, such as development tasks, ticket resolution tasks, and/or the like may be time and resource intensive, while also being prone to human error. Similarly, completing tasks to add or change functionalities of a project may require excessive amounts of custom code authoring, which may be prone to human error and resource intensive. This may result in a poor user experience, and may lead to excessive use of computing resources (e.g., from a person researching a task, performing a failed attempt to complete the task, re-researching the task, performing another attempt to complete the task, etc.). In other cases, completing a task (with or without human intervention) may be difficult due to the task management system receiving a large volume of tasks relating to a multitude of different projects. This may result in high computer processing and/or storage costs. For example, applying a task management system in a field that uses big data may require assigning tasks for tens of thousands, hundreds of thousands, or even millions of projects.

Some implementations described herein may provide for a cloud platform to assess a process based on responses to a questionnaire, to identify a tool for automatically completing the process and/or tasks thereof, to provide a recommendation relating to the tool, and to automatically complete the process and/or the tasks thereof using the tool. In this way, the cloud platform provides an end-to-end assessment and implementation of a recommendation to reduce utilization of computing resources based on faster completion of tasks (e.g., less resources may be needed to complete the task), reduce utilization of computing resources and/or network resources based on decreasing a period of time where a device is using additional resources to complete a task (e.g., a network device may use less resources to complete a task using an automated tool relative to slow, manual completion of the task by a user), and/or the like. By reducing the utilization of computing resources, the cloud platform improves overall system performance due to efficient and effective allocation of resources. Furthermore, faster resolution of processes and tasks thereof improves user experience and minimizes time that a user may lose due to the process not being completed (e.g., a user may be unable to work if a process relating to resolving a system error is not completed). Moreover, automation of task and process completion increases an accuracy of process adherence, thereby reducing errors relating to a project that includes the process relative to manual completion of a task or process in a manner that may not accord with the process.

Furthermore, implementations described herein use a rigorous, computerized process to classify processes, assess processes from automation maturity perspective, select tools for automatically completing the processes, and use the tools to automatically complete the processes or tasks thereof that were not previously performed or were previously performed using subjective human intuition or input. For example, currently there does not exist a technique to accurately identify tools for automating thousands, millions, or tens of millions of tasks that are part of the processes that may be performed for an end-to-end project lifecycle. Finally, automating the process for analyzing processes and selecting tools for automatic completion of the processes conserves computing resources (e.g., processor resources, memory resources, and/or the like) that would otherwise be wasted in attempting to manually and inefficiently complete processes that may be automatable, by ensuring that automated process completion procedures are implemented when available for a particular class of process.

FIGS. 1A-1D are diagrams of an example implementation 100 described herein. As shown in FIG. 1A, example implementation 100 may include a user device 105, a process automation platform 110, and a set of server devices 115.

As further shown in FIG. 1A, and by reference number 120, process automation platform 110 may obtain process data. For example, process automation platform 110 may obtain process data from one or more server devices 115 storing historical process data relating to a set of processes previously completed (e.g., using a set of automated tools, by a set of developers, and/or the like). Additionally, or alternatively, process automation platform 110 may obtain process data in real-time or near real-time, such as based on a new process being instantiated in a project monitored by process automation platform 110. In some implementations, process automation platform 110 may provide a web-based user interface to receive process data, receive user feedback, provide results of performing an assessment, and/or the like.

A process may include a set of tasks associated with a project. For example, for a software engineering project, processes and/or sub-processes may include requirements management processes and/or sub-processes, design processes and/or sub-processes, build processes and/or sub-processes, testing processes and/or sub-processes, deployment processes and/or sub-processes, and/or the like. Similarly, for a software testing project, processes and/or sub-processes may include planning processes and/or sub-processes, analysis processes and/or sub-processes, design processes and/or sub-processes, preparation processes and/or sub-processes execution processes and/or sub-processes, defect management and prevention processes and/or sub-processes, and/or the like. In some implementations, processes may relate to functionalities. For example, a ticket management process may relate to a ticket management functionality. In this case, completing a process may include implementing a functionality that is associated with the process, such as implementing a ticket management portal to receive and classify tickets to automatically complete a ticket logging process, which includes ticket receipt tasks, ticket classification tasks, and/or the like that are to be completed.

In some implementations, process automation platform 110 may obtain process data relating to a particular project. For example, process automation platform 110 may identify a particular software development project (e.g., a software project in a development phase, a software project in a testing phase, a software project in an ongoing management phase, and/or the like), and may obtain data regarding the particular software development project to perform a process assessment of processes of the particular software development project.

In some implementations, process automation platform 110 may obtain a particular type of process data. For example, process automation platform 110 may receive process data associated with a particular format. In this case, process automation platform 110 may receive process data including natural language descriptions of processes, tasks associated therewith, workflows for completing tasks, and/or the like. Additionally, or alternatively, process automation platform 110 may obtain numeric process data, program code associated with tools for automatically completing processes, and/or the like. In some implementations, process automation platform 110 may obtain process data identifying one or more assessment parameters of a set of processes, such as a user-defined classification of a process, a source of the process, a status of the process, and/or the like. Additionally, or alternatively, process automation platform 110 may obtain process data identifying a tool catalogue identifying a set of available tools for automatically completing tasks and/or processes.

A tool may be used to automatically complete a process or a task thereof. For example, a tool may include a software program or an application that is configured to automatically complete one or more tasks, such as generating code, altering code, copying code, and/or the like based on one or more code repositories to automatically complete a process.

In some implementations, a tool may include a plurality of sub-tools that may be configured to complete a process, such as a first tool to complete a first task of a process, a second tool to complete a second task of the process, and/or the like, that may be arranged to interact to complete the process. In this case, based on identifying a tool that may be used to complete a process, process automation platform 110 may, upon classifying a process into the class of processes, provide information associated with the process to the tool to enable the tool to automatically complete tasks of the process. Additionally, or alternatively, the tool may include a workflow or procedure for completing a process, such as a set of procedures that process automation platform 110 and/or one or more resources allocated therewith may complete to complete the process. As an example, a procedure may include configuring process automation platform 110 to automatically change a resource allocation to a software program in a particular manner based on detecting a particular status of a project to enable the software program to execute, thereby obviating a need for a developer to manually detect the particular status and cause the resource allocation to be changed.

Additionally, or alternatively, the tool may be a semi-automatic tool, such as a tool that operates and/or provides functionality of a chatbot for obtaining additional information about a process and automatically providing an alert to a preselected entity, such as providing the additional information to a developer to enable the developer to complete tasks of a process more effectively than with information already provided in a process description. Additionally, or alternatively, the tool may be a scheduling tool for scheduling completion of a process, hiring employees for completion of the process, and/or the like. In some implementations, process automation platform 110 may evaluate the tools to determine one or more or tools that may be used to complete processes. For example, process automation platform 110 may use natural language processing to process application descriptions and/or user comments regarding applications in an application store, workflows in a workflow repository, and/or the like to identify applications to use for completing processes, workflows to automatically follow to complete processes, and/or the like.

In some implementations, process automation platform 110 may obtain a subset of available process data. For example, process automation platform 110 may obtain process data relating to a particular organization or a set of organizations. In this case, process automation platform 110 may identify a set of similar organizations to a particular organization for which process analysis is to be performed, such as based on a common industry, a common set of roles, a common location, a common use of project delivery methods, and/or the like, and may obtain process data relating to processes used by the set of similar organizations. Additionally, or alternatively, process automation platform 110 may obtain process data relating to a process by providing a questionnaire, as described in more detail below, which may include questions filtered based on an industry, a role, a process type, a process subtype, and/or the like to reduce the quantity of questions provided and make the questionnaire more relevant to the process being assessed. In this way, process automation platform 110 may enable generation of a model with reduced process data relative to using process data relating to non-similar organizations, which may result in a model trained to perform classifications of types of processes that are unlikely to be used by the particular organization and have a need for automatic completion for the particular organization. Based on reducing the amount of process data, process automation platform 110 may reduce a utilization of processing resources to process the process data, memory resources to store the process data, network resources to obtain the process data, and/or the like.

As further shown in FIG. 1A, and by reference number 125, process automation platform 110 may train a process analysis model, and may use the process analysis model to classify processes and generate a set of recommendations regarding automatic process completion. For example, process automation platform 110 may process the process data to generate the process analysis model, which may be a deep neural network based model to classify processes and tools associated with automatically completing processes, to determine an assessment score of a suitability of a tool for automatically completing a process, to determine a predicted benefit (e.g., a resource utilization reduction) from implementing a tool for automatically completing a process, and/or the like. In some implementations, process automation platform 110 may perform a set of data manipulation procedures to process the process data to generate the process analysis model, such as a data preprocessing procedure, a model training procedure, a model verification procedure, and/or the like.

In some implementations, process automation platform 110 may perform a data preprocessing procedure when generating the process analysis model. For example, process automation platform 110 may preprocess unstructured process data to remove non-ASCII characters, white spaces, confidential data, and/or the like. In this way, process automation platform 110 may organize thousands, millions, or billions of data entries for machine learning and model generation—a data set that cannot be processed objectively by a human actor. Additionally, or alternatively, process automation platform 110 may remove numbers from the process data, other special characters from the process data, stop words from the process data, punctuation from the process data, whitespaces from the process data, and/or the like. In some implementations, process automation platform 110 may perform a stemming operation on words of the process data to identify roots of the words of the process data and based on a stemming data structure identifying roots for words. For example, process automation platform 110 may perform the stemming operation on a natural language description of a tool (e.g., a name, a tool description, a tool purpose description) to determine whether a tool may be used to automatically complete one or more tasks of a process. Similarly, process automation platform 110 may perform the stemming operation on a natural language description of a process, a natural language response to a process questionnaire, as described in more detail below, and/or the like.

In some implementations, process automation platform 110 may perform a training operation when generating the process analysis model. For example, process automation platform 110 may portion the data into a training set, a validation set, a test set, and/or the like. In some implementations, process automation platform 110 may perform a named entity recognizer (NER) technique to train the process analysis model. For example, process automation platform 110 may perform feature extraction from natural language descriptions of processes and/or tools using the NER technique to enable a semantic determination relating to a process, a tool, and/or the like based on natural language descriptions of the process, the tool, and/or the like. In this case, for example, process automation platform 110 may extract a name of a tool as a feature vector and may associate the feature vector with numerical values representing questionnaire responses, and process automation platform 110 may use information associated with the feature vector to assess a project. For example, process automation platform 110 may perform a lookup to identify similar tools based on comparing the feature vector with other feature vectors corresponding to other tools. In some implementations, process automation platform 110 may deduplicate a list of tools using semantic meanings of words. In some implementations, process automation platform 110 may perform a semantic search technique to train the process analysis model. For example, process automation platform 110 may perform a set of semantic searches (e.g., identifying context, intent, variation, and/or the like in words of a description of a process or tool) to identify similar processes or tools from which to form an association (e.g., a class of processes, a tool that may automate processes of the class of processes, and/or the like).

In some implementations, process automation platform 110 may perform a deep learning technique and natural language processing technique to train the process analysis model. For example, process automation platform 110 may use artificial intelligence to perform sentence-level, word-level, character-level, and/or the like based learning regarding natural language descriptions of processes and/or tools associated therewith. In this case, process automation platform 110 may determine tasks associated with processes, may identify tools relating to tasks, identify effort savings associated with implementing tools to complete tasks (e.g., reductions in computing utilization, memory utilization, time, etc. based on data entries identifying results of using tools to complete tasks), and/or the like. Further, process automation platform 110 may identify word embedding values identifying a semantic relationship between different words, thereby enabling the process analysis model to represent the semantic relationships between different words to enable a prediction regarding a subsequent process (e.g., a classification into a class, a determination of whether the process is automatable using a tool, and/or the like). Based on using deep learning techniques, process automation platform 110 may improve accuracy of the process analysis model relative to other techniques based on being more capable of performing an accurate prediction from a limited data set (e.g., a data set of relatively few words describing a particular process, task, or tool).

In some implementations, process automation platform 110 may train the process analysis model using, for example, an unsupervised training procedure and based on the training set of the data. In some implementations, process automation platform 110 may perform dimensionality reduction to reduce the data to a minimum feature set, thereby reducing processing to train the process analysis model, and may apply a classification technique, to the minimum feature set. In some implementations, process automation platform 110 may use a logistic regression classification technique to determine a categorical outcome (e.g., that a process is to be assigned to a particular class of a set of classes, a particular sub-class, and/or the like).

Additionally, or alternatively, process automation platform 110 may use a naïve Bayesian classifier technique for sentiment analysis. In this case, process automation platform 110 may perform binary recursive partitioning to split the data of the minimum feature set into partitions and/or branches, and use the partitions and/or branches to perform predictions (e.g., a process is a member of a particular class of processes, that a particular class of processes is automatable using a particular tool, and/or the like). Based on using recursive partitioning, process automation platform 110 may reduce utilization of computing resources relative to manual, linear sorting and analysis of data points, thereby enabling use of thousands, millions, or billions of data points to train a model, which may result in a more accurate model than using fewer data points. In some implementations, process automation platform 110 may use a bag-of-words type model, a vector space model, to enable natural language processing and information retrieval, and to perform sentiment analysis (e.g., to identify positive sentiment, negative sentiment, and/or the like. In this way, process automation platform 110 may identify tasks for which an automation recommendation would be useful (e.g., a task where a user "disagrees" that an automation is in place, a task where a user "agrees" that an automation is in place but a sentiment of a user comment is negative indicating that the tool is ineffective, etc.).

In some implementations, process automation platform 110 may use a support vector machine (SVM) classifier technique to generate a non-linear boundary between data points in the training set. In this case, the non-linear boundary is used to classify test data (e.g., data relating to a process or tool) into a particular class (e.g., a class indicating that the process is a first type of process, a second type of process, and/or the like; or that a class is automatable or not automatable using one or more tools).

In some implementations, process automation platform 110 may train the process analysis model using a supervised training procedure that includes receiving input to the model from a subject matter expert, which may reduce an amount of time, an amount of processing resources, and/or the like to train the process analysis model relative to an unsupervised training procedure. In some implementations, process automation platform 110 may use one or more other model training techniques, such as a neural network technique, a latent semantic indexing technique, and/or the like. For example, process automation platform 110 may perform an artificial neural network processing technique (e.g., using a two-layer feedforward neural network architecture, a three-layer feedforward neural network architecture, and/or the like) to perform pattern recognition with regard to patterns of whether processes including different semantic descriptions are members of a particular class, whether the particular class is automatable using a tool that is configured to resolve another class of processes, and/or the like. In this case, using the artificial neural network processing technique may improve an accuracy of a model generated by process automation platform 110 by being more robust to noisy, imprecise, or incomplete data, and by enabling process automation platform 110 to detect patterns and/or trends undetectable to human analysts or systems using less complex techniques.

In some implementations, process automation platform 110 may generate a questionnaire regarding a process. For example, process automation platform 110 may use the process analysis model to identify a subset of a set of assessment parameters of processes that correlate to whether the process is automatable using a particular tool. In this case, process automation platform 110 may generate a set of values for the subset of the set of assessment parameters that can be determined for a new process to classify the new process and provide a recommendation regarding whether to automate the new process with a particular tool.

In some implementations, process automation platform 110 may parse a natural language description of the new process to assign scores to the subset of the set of assessment parameters based on a semantic meaning of the natural language description determined using the process analysis model, and resulting in process automation platform 110 classifying the new process autonomously.

In some implementations, when performing a natural language processing (e.g., to determine a meaning of a tool description, a questionnaire response, etc.) or natural language generation technique (e.g., for a virtual assistant as described herein), process automation platform 110 may perform a content determination procedure (e.g., determining content to be represented in a sentence), a document restructuring procedure (e.g., structuring a conveyed context of a sentence), an aggregation procedure (e.g., to combine multiple sentences having sequential meanings), a lexical choice procedure (e.g., to select appropriate words), a referring expression generation procedure (e.g., to identify objects, pronouns, remotely related objects, links between document sections), a realization procedure (e.g., to create and/or optimize a sentence grammatically), and/or the like.

Additionally, or alternatively, the questionnaire may be a set of natural language questions regarding the new process. For example, process automation platform 110 may generate and provide a set of questions, corresponding to a set of assessment parameters, with a set of answer categories to a user via a user interface to obtain information about the new process. In this case, the set of questions may be associated with categorical responses (e.g., a numerical response, an agree/somewhat agree/disagree response/not relevant type response, etc.), qualitative responses (e.g., a request for a natural language response to the question that is to be parsed to determine a semantic meaning of the natural language response), and/or the like. In some implementations, process automation platform 110 may use the questionnaire responses to determine whether a particular project is complying with one or more standards (e.g., an industry standard, a standardized process), whether a particular project is satisfying one or more benchmark criteria, a level to which a particular process of the particular project may be automated, and/or the like.

In some implementations, the questionnaire may be associated with a particular project type that process automation platform 110 may determine based on classifying a project, such as a service delivery project, a software engineering project, a software testing project, a development operations project, an agile project, an industry practices project, a project management project, a business process, and/or the like. In some implementations, the questionnaire may be associated with a particular sub-type, such as for service delivery (e.g., incident management, request fulfillment, problem management, change management, service level management, knowledge management, etc.), for software engineering (e.g., requirements management, design, build, test, deploy, etc.), for software testing (e.g., plan test, analyze test, design test, prepare test, execute test, defect management and prevention, etc.), for development operations (e.g., delivery organization and methodology, lean delivery governance and processes, automated release of software, continuous integration, continuous delivery, automated operations, software defined infrastructure and cloud architecture, platform or application architecture, development practice, etc.), for agile (e.g., agile mindset and delivery, agile project management, measure and manage, operations and reporting, agile project execution, tools and engineering, etc.), and/or the like. In some implementations, the questionnaire may be associated with a hierarchy, such as a delivery type (e.g., agile delivery, agile management, testing etc.), a category of the delivery type (e.g., project management, service delivery, industry, etc.), a process area of the category (e.g., incident management), a sub-process area of the process area (e.g., incident logging), and/or the like.

In some implementations, process automation platform 110 may perform the process assessment based on a set of best practices associated with a project type or sub-type. For example, process automation platform 110 may identify questionnaire questions and perform the process assessment based on application operations best practices, application development best practices, application testing best practices, development operations best practices, agile best practices, and/or the like.

In this case, based on an industry, a process type, a process sub-type, and/or the like, process automation platform 110 may filter a set of questions corresponding to a set of assessment parameters that are to be determined. Based on filtering questions based on the hierarchy, process automation platform 110 may reduce a quantity of questions that are provided to obtain information relating to generating a recommendation for a tool to automate a process relative to using less granularity for assessing a process. In some implementations, process automation platform 110 may determine to evaluate assessment parameters relating to the questions based on a particular scale, such as a numeric scale, a categorical scale, and/or the like. For example, process automation platform 110 may determine a set of assessment scores for a set of assessment parameters relating to a tool and a process, and may correlate the set of assessment scores to whether the tool was successful at automating the process. In this case, process automation platform 110 may determine a threshold assessment score to recommend a new tool for automating a new process when performing a subsequent assessment.

In some implementations, process automation platform 110 may provide industry specific questions and determine assessment parameters relating thereto, such as financial services specific questions, airline specific questions, healthcare specific questions, public services specific questions, manufacturing specific questions, resources management specific questions, utilities specific questions, and may recommend industry specific tools based on responses to the industry specific questions. In some implementations, process automation platform 110 may obtain or generate questions relating to a best practices determination, such as questions derived from an Information Technology Infrastructure Library (ITIL) service management best practices document, a capability maturity model integration (CMMI) best practices document, and/or the like, thereby enabling assessment of a process with respect to best practices and recommendation of a tool that follows best practices (e.g., and is therefore more likely to align to a process that is to follow best practices).

As further shown in FIG. 1A, and by reference number 130, process automation platform 110 may receive, from user device 105, a request for a process assessment. For example, process automation platform 110 may receive a request to analyze a particular process for automation, to analyze a set of processes for automation, and/or the like. In some implementations, process automation platform 110 may train the process analysis model, perform the process assessment, and generate a recommendation based on the request. For example, process automation platform 110 may receive the request from user device 105 for a recommendation regarding automation of a process, and may generate the process analysis model and perform a process assessment to generate a recommendation as a response to the request.

In some implementations, automation platform 110 may determine an assessment scope to perform the process assessment. For example, automation platform 110 may receive information identifying a type of project for which the process assessment is to be performed, a project for which the process assessment is to be performed, a subpart of a project for which the process assessment is to be performed, and/or the like.

In some implementations, automation platform 110 may provide a web-based front end to receive the request to perform the process assessment, and may receive the request via the web-based front end. In this case, automation platform 110 may provide a set of questionnaire questions, a set of options for configuring the process assessment, a set of results of performing the process assessment, and/or the like via the web-based front end. In some implementations, the web-based front end may be configured to access a database storing data as described herein, such as using an Angular JS or ASP.NET front end connected to a SQL database with a set of Python based recommendation scripts. In some implementations, the front-end may use representational state transfer (REST) or RESTful application programming interfaces (APIs) and/or may use simple object access protocol (SOAP), which may reduce bandwidth utilization thereby improving functioning of automation platform 110.

In some implementations, process automation platform 110 may train the process analysis model, perform a process assessment, and generate a recommendation based on detecting a trigger. For example, periodically, based on receiving a set of tickets, process automation platform 110 may train the (or update a trained) process analysis model, and may use the process analysis model to automate a process for resolving the set of tickets. Additionally, or alternatively, based on detecting availability of a new tool for automatically completing a task or a process, process automation platform 110 may evaluate one or more classes of processes for automatic completion using the new tool. Additionally, or alternatively, based on identifying a new class of processes or a new project that includes a set of processes, process automation platform 110 may determine a similarity to another class that is being automatically completed, and may predict an effort (e.g., computing resources, cost, man-hours, etc.) associated with adapting a tool being used to automatically complete the other class for use in automatically completing the new class (e.g., to reprogram the tool, to allocate additional resources to the tool, to transfer data to a memory that is accessible by the tool, etc.).

As further shown in FIG. 1A, and by reference numbers 135 and 140, process automation platform 110 may perform the process assessment and may provide a process assessment user interface. For example, process automation platform 110 may generate a recommendation relating to automating a process based on analyzing the process using the process analysis model. In this case, process automation platform 110 may determine one or more tools for process completion, a resource allocation for operating the one or more tools, a cost associated with implementing the one or more tools, a benefit achieved by implementing the one or more tools, a ranking of the one or more tools relating to predicted suitability for automating the process and/or the like. In this case, process automation platform 110 may determine the one or more tools based on one or more assessment scores associated with a process and the one or more tools (e.g., scored based on the process analysis model and a set of questionnaire responses).

In some implementations, process automation platform 110 may generate an automation blueprint based on the recommendation, which may include information identifying the recommendation, a tool associated therewith, a benefit, a tool maturity level (e.g., a classification identifying an extent to which a tool is suitable for use in automation), and/or the like. In some implementations, process automation platform 110 may track information for improving a subsequent automation blueprint, such as including a comments feedback user interface element in a user interface element to obtain a task based evaluation (e.g., a rating of a helpfulness of a recommendation), a textual rating (e.g., a rating of text provided in connection with the automation blueprint), a metric relating to the recommendation, and/or the like.

In some implementations, process automation platform 110 may determine a recommendation for a particular class of processes. For example, process automation platform 110 may determine an assessment score for each class of processes related to a predicted automatability for completing a class of processes using a tool available to process automation platform 110. In this case, process automation platform 110 may select a class of processes for automation based on a highest assessment score or a threshold assessment score.

In some implementations, process automation platform 110 may rank or order one or more classes of processes for automation. For example, process automation platform 110 may apply a set of weights to a set of assessment parameters of a set of classes of tickets (e.g., weights to criticality scores, assessment scores, predicted inflow volume, and/or the like), to sort the set of classes in terms of priority for generating an automation plan. In some implementations, based on determining an automation plan with a recommendation for automation, process automation platform 110 may track the automation plan (e.g., user engagement with the automation plan, a success of implementing the automation plan, and/or the like to provide usage information, effectiveness information, and/or the like as feedback to further improve the process analysis mode, a recommendation engine, and/or the like).

In some implementations, process automation platform 110 may score one or more candidate recommendations based on an assessment score (e.g., associated with each recommendation), a resource utilization, a likelihood of success (e.g., a predicted likelihood that a tool is applicable to completing a process), a cost of manual completion of a process, and/or the like. In this case, process automation platform 110 may determine that a subset of recommendations satisfy a threshold score (e.g., a threshold assessment score, another threshold score, etc.), and may recommend implementation of the subset of recommendations (e.g., recommend completion of the process using a subset of available tools).

In some implementations, process automation platform 110 may generate the recommendation based on using artificial intelligence techniques. For example, process automation platform 110 may use data identifying success of previous recommendations, an accuracy of a classification of a process, natural language user feedback on tools for automatically completing processes, and/or the like to generate a machine learning model for recommendations, as described above with regard to ticket classification, and may use the machine learning model for recommendations to evaluate one or more candidate recommendations, and select a subset of candidate recommendations. In some implementations, process automation platform 110 may use a collaborative filtering based recommendation engine (e.g., identifying tools already recommended for similar processes associated with similar projects based on an industry, technology, task, and/or the like of the similar projects based on scalar ratings, explicit ratings determined from user rating feedback, implicit ratings determined from monitoring user behavior, and/or the like of tools), a content-based filtering or cognitive filtering based recommendation engine (e.g., identifying tools used in a same project for performing other tasks of the project), a combination of collaborative filtering techniques and content-based filtering techniques for a recommendation engine, and/or the like. In some implementations, process automation platform 110 may use a non-probabilistic algorithm, a probabilistic algorithm, a task-based nearest neighbor algorithm, a tool-based nearest neighbor algorithm, a dimensionality reduction algorithm, a Bayesian-network model algorithm, an expectation maximization algorithm, and/or the like to perform collaborative filtering.

In some implementations, process automation platform 110 may determine an automation maturity score. For example, the automation maturity score may represent a percentage of tasks that are fully or partially automated using a particular process, which may be weighted based on categorical questionnaire responses (e.g., an agree response may receive a first weight, a partially agree response may receive a second weight, etc.). In some implementations, process automation platform 110 may determine an automation maturity level. For example, process automation platform 110 may determine a weighted adoption of automation for a project that includes a set of processes. In some implementations, the automation maturity level may be determined on a project basis, a project subpart basis, and/or the like. In this case, process automation platform 110 may determine an automation benefit, an automation recommendation, and/or the like based on the automation maturity score, the automation maturity level, and/or the like.

In some implementations, process automation platform 110 may determine a process maturity score. For example, the process maturity score may represent a compliance of a process in terms of an industry benchmark, a standard, a guideline, a template, and/or the like, and may relate to documentation, definition, execution, monitoring, tracking, and/or the like for the process. In this case, process automation platform 110 may determine the process maturity score based on weighting responses to questionnaire questions, and may use the process maturity score to determine a suitability of a process for automation.

In some implementations, process automation platform 110 may filter one or more tools from being recommended. For example, process automation platform 110 may determine that a tool maturity does not satisfy a threshold maturity level, that a tool is already deployed for the process, that a first tool is equivalent to a second tool that is already deployed for the process, and/or the like. In this way, process automation platform 110 increases a likelihood that a tool that is recommended improves automatic completion of the process relative to allowing tools without a threshold maturity level or tools that are already deployed to be recommended.

Additionally, or alternatively, process automation platform 110 may use the process analysis model to rank the set of recommendations and/or tools associated therewith based on an amount of resources required to resolve the issue. For example, process automation platform 110 may determine a set of values indicating an estimated amount of resources needed to complete a process. In this case, a value, in the set of values, may correspond to a recommended tool, in the set of recommended tool. Process automation platform 110 may rank the set of recommended tool based on determining the corresponding set of values indicating the estimated amount of resources needed to complete the process. In some cases, process automation platform 110 may select a particular tool that corresponds to a value associated with a lowest estimated amount of resources needed to complete the process. By ranking tools based on an amount of resources (or an estimated amount of resources) needed to resolve the issue, process automation platform 110 is able to conserve processing resources and/or network resources by selecting the most resource-efficient resolution.

In some implementations, process automation platform 110 may use the process analysis model to select a particular tool to recommend that satisfies a threshold (or that satisfies multiple thresholds). The threshold(s) may indicate an effectiveness level of completing a process or a task thereof, an amount of resources to complete the process or task, an amount of time to complete the process or task, a percentage chance of successfully completing the process or task, and/or the like. In some cases, such as when multiple tools satisfy the threshold, process automation platform 110 may select the particular tool for that satisfies the threshold by the largest margin. For example, if multiple tools indicate an 80%+ effectiveness level of completing a process, process automation platform 110 may select the particular tool with the highest predicted effectiveness level of completing the process.

In some implementations, process automation platform 110 may use information regarding a previous success in applying a tool to determine the recommendation. For example, process automation platform 110 may monitor use of recommended tools to complete processes and/or obtain user feedback (e.g., process level feedback regarding processes, sub-process level feedback regarding tasks, etc.) on use of recommended tools to complete processes to update the process analysis model, thereby enabling improved accuracy with regard to recommendations overtime. In this case, process automation platform 110 may apply relatively higher weights to tools that were successfully recommended and lower weights to tools that were unsuccessfully recommended, thereby improving recommendations via reinforcement learning, excluding tools that are incorrectly identified based on descriptions from subsequent recommendation, and/or the like.

In some implementations, process automation platform 110 may generate a user interface view associated with the recommendation. For example, process automation platform 110 may dynamically generate one or more visualizations to provide descriptive analytics regarding a recommendation for process automation, such as a time series graph (e.g., predicting resource utilization associated with subsequent tasks of a process), a bar graph, a column graph, a stacked bar graph, a stacked column graph, color coding (e.g., red, amber, green color coding), and/or the like to improve rapid analysis of the recommendation. Additionally, or alternatively, process automation platform 110 may generate area charts, bar charts, column charts, heat maps, pie charts, tree maps, combinations thereof, and/or the like.

In some implementations, process automation platform 110 may monitor use of a process assessment user interface to identify user preferences with regard to the user interface (e.g., which graphs the user is interacting with), and may dynamically update subsequent user interface views based on the user preferences. In some implementations, process automation platform 110 may use artificial intelligence techniques to generate the user interface views, such as based on generating a visualization model based on visualization data relating to previous user usage of user interfaces including visualizations, other user's usages of user interfaces including visualizations, and/or the like. For example, process automation platform 110 may use artificial intelligence techniques to identify relevant features of the process data (e.g., anomalous features, significant features, patterns, trends, etc.), may predict one or more user interface views that a user is associated with a threshold likelihood of viewing for a threshold amount of time (e.g., based on previous use of user interfaces and indicating that the predicted user interface is relevant to the user), and may generate one or more graphs for a predicted user interface view to identify the relevant features, thereby reducing computing utilization relative to a user manually reviewing all graphs to identify the relevant features.

In some implementations, process automation platform 110 may implement a virtual assistant feature associated with the user interface. For example, process automation platform 110 may use natural language processing to enable a user to communicate with process automation platform 110 using natural language to request information regarding a recommendation, to receive help navigating the user interface, to provide intelligent alerts regarding the recommendation (e.g., to transmit a set of alerts to a set of users regarding automation of a process), and/or the like. Additionally, or alternatively, process automation platform 110 may automatically provide other documentation to identify the meaning of a question in the questionnaire, the meaning of a diagram in a visualization, and/or the like.

As shown in FIG. 1B, based on receiving the process assessment user interface from process automation platform 110, user device 105 may provide information relating to a process assessment. For example, based on process automation platform 110 automatically classifying a process, the process assessment user interface may include information identifying a scope of a process, a set of areas of the process, a set of automatically generated questionnaire questions and/or automatically determined responses for the process, and/or the like. Additionally, or alternatively, process automation platform 110 may provide questionnaire questions via the user interface based on classifying the process, and may receive feedback from a user responding to the questionnaire questions (e.g., altering a determined answer to a question, providing a comment regarding a question, etc.). For example, process automation platform 110 may receive a set of comments from a user regarding a questionnaire question, and may parse the set of comments to determine values for a set of assessment parameters relating to the process, such as a frequency value for performing the process, a criticality value for errors in the process, and/or the like that may be semantically determined using process analysis model, as described above.

Figure 1C:
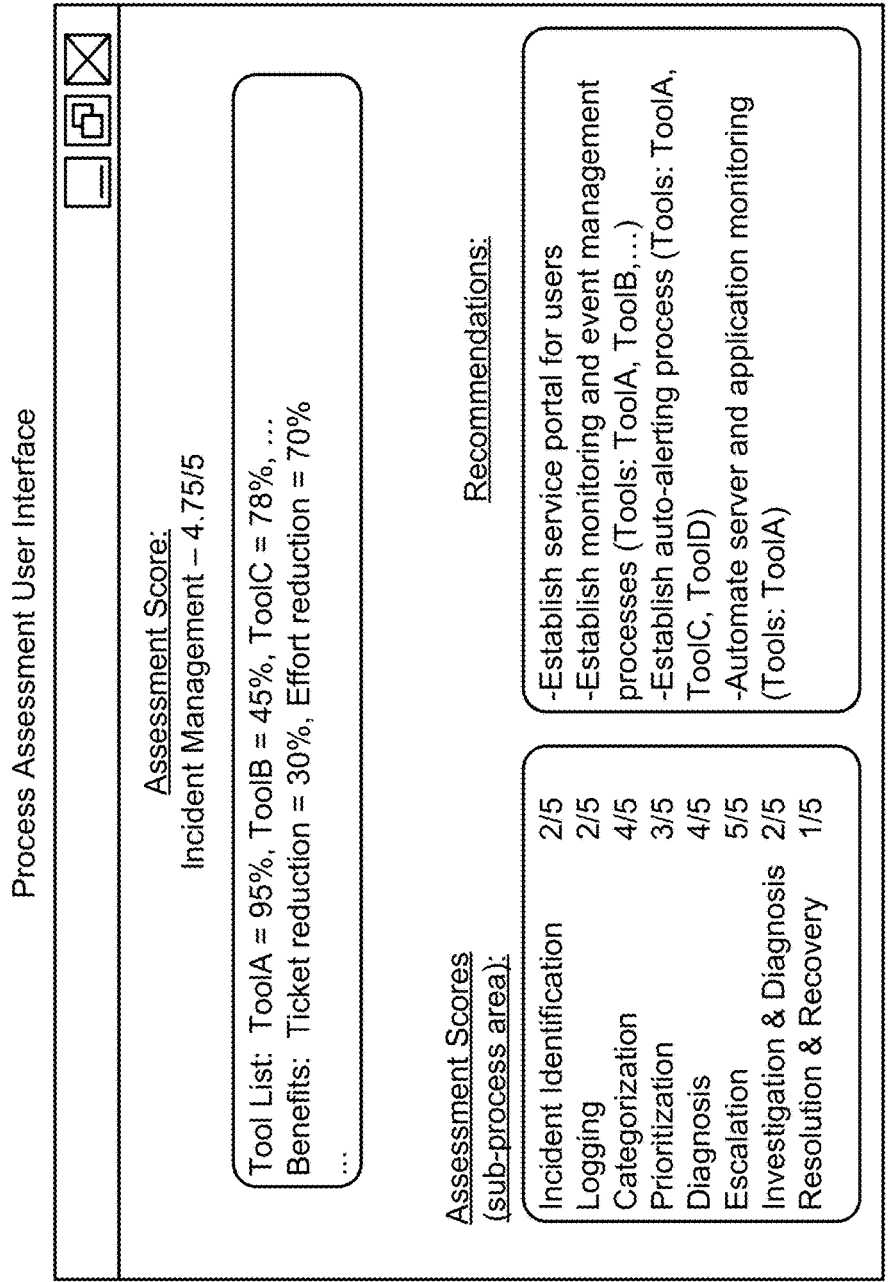

As shown in FIG. 1C, based on receiving the process assessment user interface from process automation platform 110, user device 105 may provide the process assessment user interface for display. In this case, the process assessment user interface may include information identifying an assessment score for a process. For example, process automation platform 110 may determine an assessment score identifying a suitability for a process being automated (e.g., using one or more tools), a sub-process of the process being automated (e.g., using one or more tools), and/or the like. Further, based on a determination by process automation platform 110, the process assessment user interface may include information identifying a set of scores for a set of tools, which identify a suitability of each tool for automating a process and/or one or more tasks thereof. Further, based on a determination by process automation platform 110, the process assessment user interface may include information identifying a benefit of implementing a tool to automate a process, such as reduced effort (e.g., processing utilization, memory utilization, man-hour utilization, etc.), reduced errors (e.g., a reduction in tickets generated relating to the process), and/or the like. Further, based on a determination by process automation platform 110, the process assessment user interface may include one or more recommendations relating to the process assessment, such as a recommendation relating to implementing a tool (e.g., a service portal tool, a monitoring tool, an alert tool, and/or the like) to automate one or more processes, sub-processes, and/or the like.

In some implementations, process automation platform 110 may automatically implement one or more of the recommendations. For example, process automation platform 110 may determine to automatically allocate resources to an application for automatically completing a process, providing a functionality, and/or the like. In some implementations, process automation platform 110 may determine to automatically implement a recommendation based on a score. For example, process automation platform 110 may determine that a tool satisfies a threshold process assessment score indicating a threshold likelihood of success, a threshold reduction in processing resource utilization, a threshold cost reduction, and/or the like, and may automatically determine to implement the tool. Additionally, or alternatively, process automation platform 110 may receive user input via the process assessment user interface associated with selecting a subset of recommendations and implementing the subset of recommendations.

In some implementations, process automation platform 110 may automatically generate additional program code for a tool, alter or remove existing program code of a tool, allocate and/or reallocate computing resources to a tool, automatically assign a developer to adapt a tool, and/or the like to implement a recommendation. In some implementations, process automation platform 110 may access one or more APIs to gain permission to implement a tool for a process. By automatically implementing tools to automatically complete processes, process automation platform 110 achieves faster process completion, thereby conserving network resources by decreasing a period of time where a device is using additional resources to complete a task.

In some implementations, process automation platform 110 may automatically communicate with another device to implement a tool. For example, process automation platform 110 may communicate with another device to automatically assign a developer to instantiate a tool for automatically completing a process of a project. In this case, the other device may store information such as a schedule of a developer, and process automation platform 110 may access the schedule to add a task or schedule a meeting relating to instantiating the tool. For example, process automation platform 110 may determine a set of shifts for a set of developers, identify a developer that is active for an upcoming shift and has availability and/or skills to instantiate the tool (e.g., skills relating to a type of the tool), and may communicate with the other device to automatically assign a tool instantiation task to the developer. Similarly, based on the developer having previously instantiated the tool for another process, process automation platform 110 may reassign the tool instantiation task to the developer.

In some implementations, process automation platform 110 may automatically communicate with another device to allow the other device to implement a recommendation. For example, process automation platform 110 may automatically transmit information that indicates the particular recommendation to another device (e.g., a server associated with user device 105, etc.), and the other device may implement the particular recommendation by enabling a tool.

In some implementations, process automation platform 110 may implement a particular recommendation that includes modifying code and/or computing resources. For example, process automation platform 110 may generate code, alter code, remove code, allocate computing resources, and/or reallocate computing resources to enable a tool to automate a process. In some cases, process automation platform 110 may communicate with a data server associated with a software project associated with the process to generate code, alter code, remove code, allocate computing resources, and/or reallocate computing resources. Additionally, or alternatively, process automation platform 110 may automatically configure or reconfigure one or more devices, may start up one or more devices, power down one or more devices, and/or the like to enable a tool. Additionally, or alternatively, process automation platform 110 may move a robot or a drone to a particular area to perform a process, when the tool is the robot or the drone. Additionally, or alternatively, process automation platform 110 may automatically order a replacement robot or drone to a particular location to enable a tool. In some implementations, process automation platform 110 may provide an alert identifying a tool, to enable a user to activate the tool to automate the process (e.g., via interacting with the tool in a user interface, via responding to the alert, and/or the like).

In some implementations, process automation platform 110 may automatically determine an effectiveness level of implementing the recommendation. For example, process automation platform 110 may automatically determine an effectiveness level of implementing the recommendation by testing the process in a sandbox environment or by monitoring a project associated with the process after enabling the tool. As an example, process automation platform 110 may implement a test script to mirror functionality of the project in a sandbox to determine whether the particular tool automatically and successfully performs the process. Additionally, or alternatively, process automation platform 110 may determine an effectiveness level of implementing the recommendation by receiving feedback. For example, process automation platform 110 may receive feedback, and the feedback may indicate an effectiveness level of the recommendation. In some cases, process automation platform 110 may use the effectiveness information to reevaluate the tool for automatically completing the process with regard to whether to continue to use the tool.

Figure 1D:
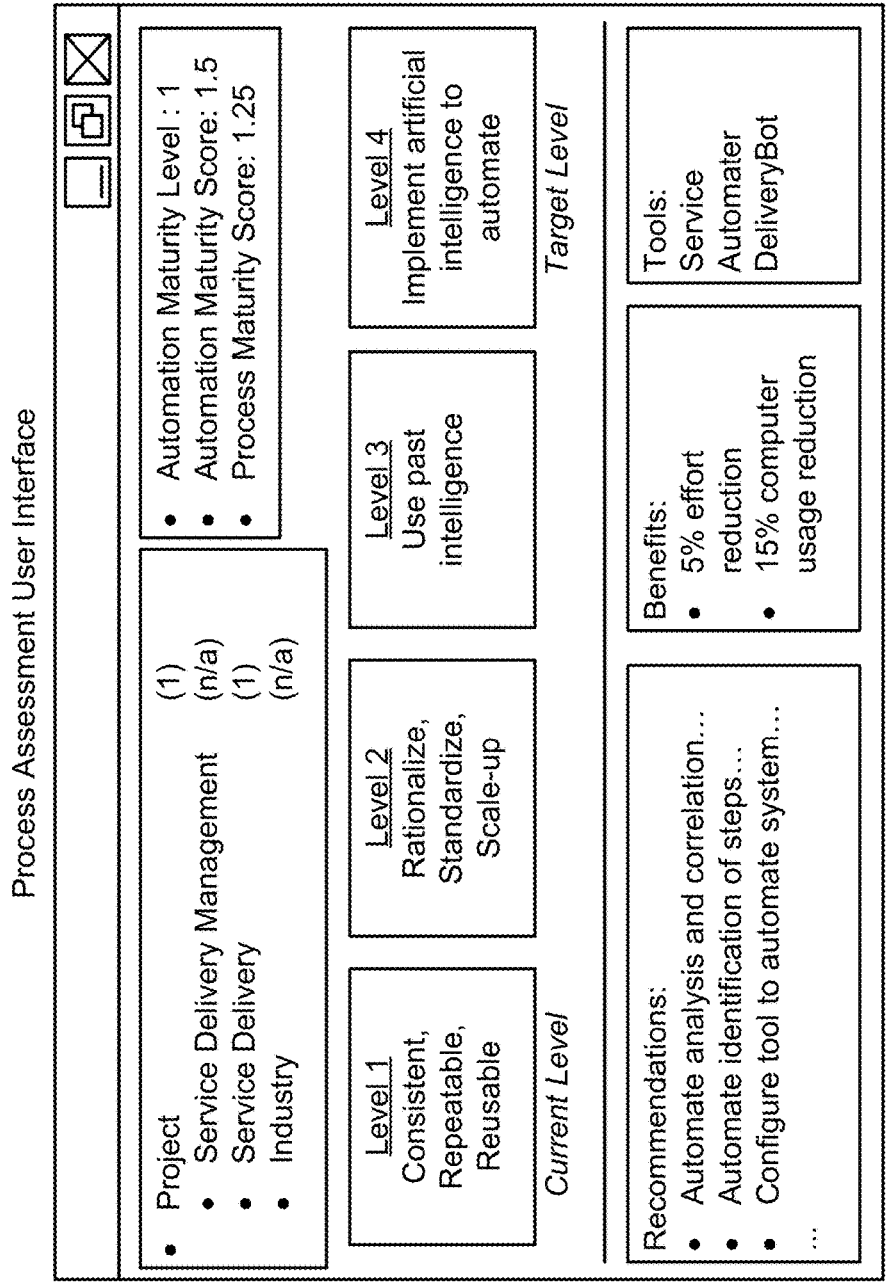

As shown in FIG. 1D, as another example, based on receiving the process assessment user interface from process automation platform 110, user device 105 may provide the process assessment user interface for display. In this case, the process assessment user interface may include information identifying an automation maturity level at different hierarchies, such as a project level, a delivery type level, etc. Further, the process assessment user interface may include an automation maturity level, an automation maturity score, a process maturity score, and/or the like. Further, process automation platform 110 may generate a customized visualization of automation maturity levels for the project, and steps that are to be completed at each level. In this case, process automation platform 110 may identify the current level, a target level for automation using one or more tools, and/or the like. Further, the process assessment user interface may include recommendations, benefits associated with implementing the recommendations, and tools to use to further a process and/or tasks thereof towards automation.

In this way, process automation platform 110 reduces utilization of computing resources based on automatically classifying process data to reduce processing, reduces utilization of computing resources based on faster completion of a process, reduces utilization of computing resources and/or network resources based on decreasing a period of time where a device is using additional resources to complete a process manually, and/or the like. Furthermore, faster completion of a process improves user experience and minimizes time that a user may lose due to the process being manually completed. Furthermore, using the process analysis model to automatically select tools for automatically completing processes improves automation of process completion as a quantity of tools increases and/or a quantity of processes increases beyond what can be manually classified and manually completed.

As indicated above, FIGS. 1A-1D are provided merely as an example. Other examples are possible and may differ from what was described with regard to FIGS. 1A-1D.

Figure 2:
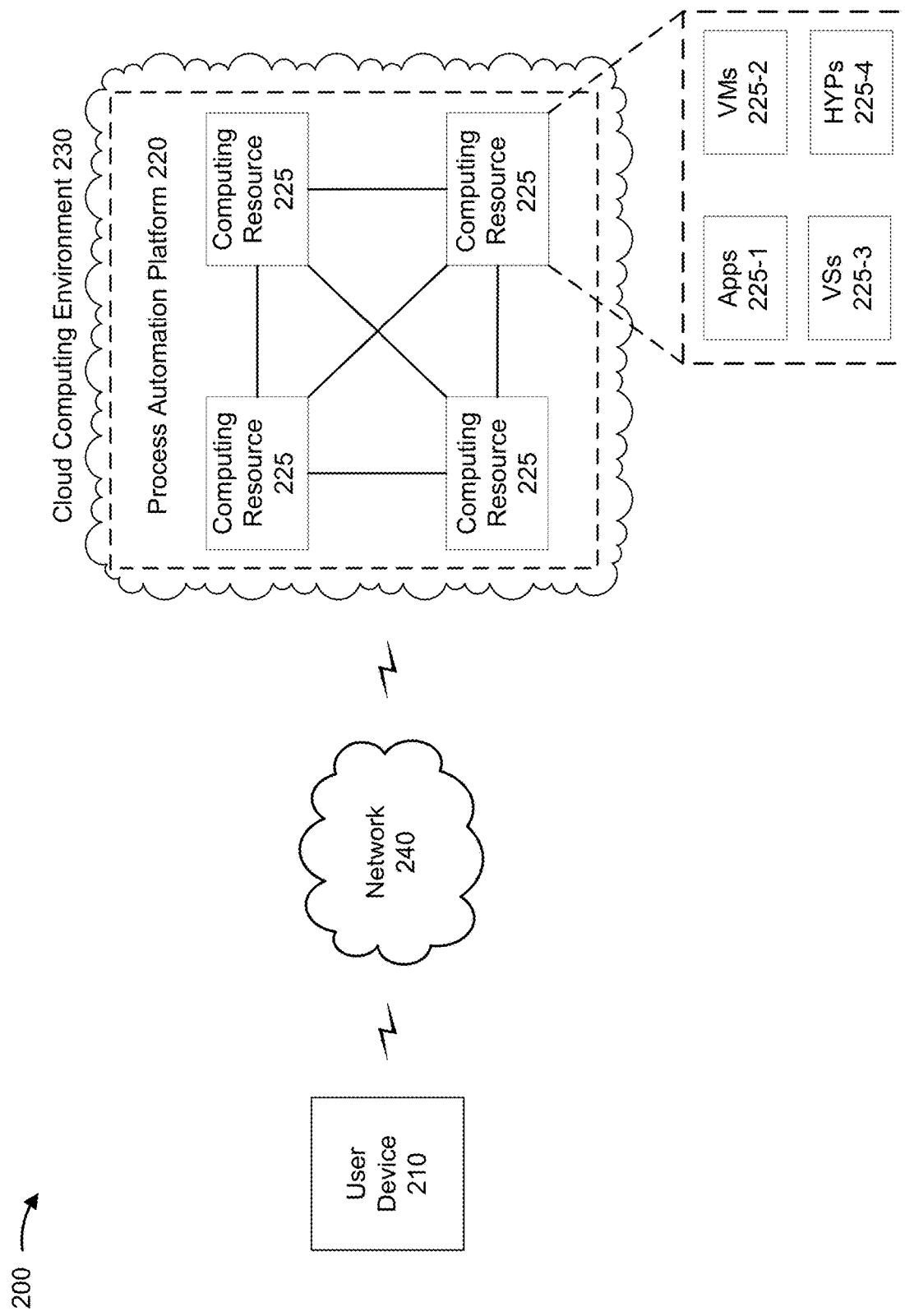
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a process automation platform 220, and a computing resource 225. Devices of environment 200 may interconnect via wired connections, wireless connections, or a combination of wired and wireless connections.

User device 210 includes one or more devices capable of receiving, generating, storing, processing, and/or providing information associated with providing a user interface associated with a process assessment. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 corresponds to user device 105 shown in FIG. 1A.

Process automation platform 220 includes one or more computing resources assigned to classify processes, determine a recommendation relating to using a tool to automate a process, and/or the like. For example, process automation platform 220 may be a platform implemented by cloud computing environment 230 that may determine a classification for a process, and may select a tool to automatically complete the process. In some implementations, process automation platform 220 is implemented by computing resources 225 of cloud computing environment 230. In some implementations, process automation platform 220 may allocate resources (e.g., computing resources 225) for executing a tool to automatically complete a process. In some implementations, process automation platform 220 corresponds to process automation platform 110 shown in FIG. 1A.

Cloud computing environment 230 includes an environment that delivers computing as a service, whereby shared resources, services, etc. may be provided to classify processes, select tools to automatically complete processes, and automatically complete the processes. Cloud computing environment 230 may provide computation, software, data access, storage, and/or other services that do not require end-user knowledge of a physical location and configuration of a system and/or a device that delivers the services. As shown, cloud computing environment 230 may include process automation platform 20 and computing resource 225.

Computing resource 225 includes one or more personal computers, workstation computers, server devices, or another type of computation and/or communication device. In some implementations, computing resource 225 may host process automation platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, and/or the like.

Application 225-1 includes one or more software applications that may be provided to or accessed by user device 210. Application 225-1 may eliminate a need to install and execute the software applications on user device 210. For example, application 225-1 may include software associated with process automation platform 220 and/or any other software capable of being provided via cloud computing environment 230. In some implementations, one application 225-1 may send/receive information to/from one or more other applications 225-1, via virtual machine 225-2. In some implementations, an application 225-1 may be a tool accessible to process automation platform 220 to automatically complete a process.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
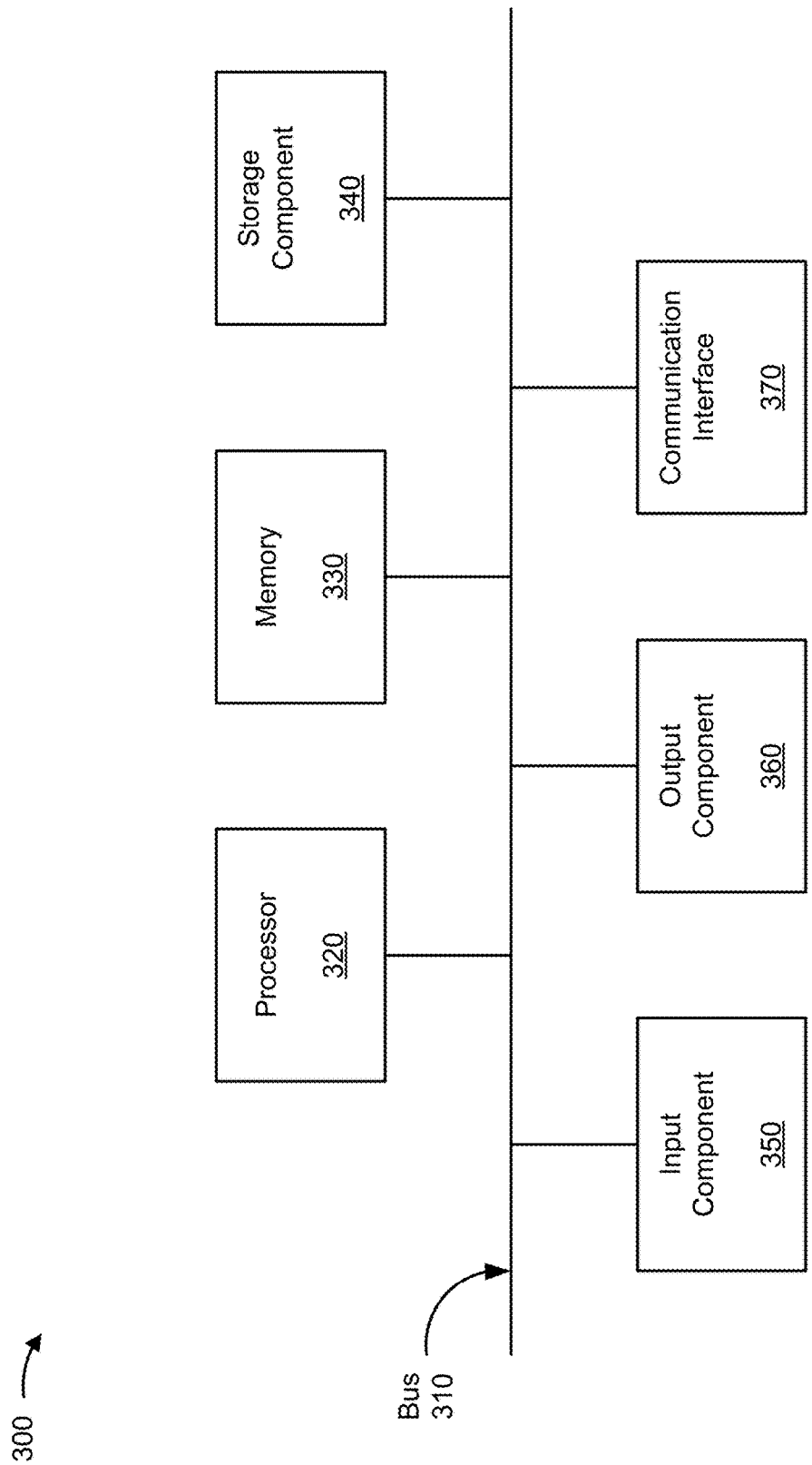
FIG. 3 is a diagram of example components of one or more devices of FIG. 2.

FIG. 3 is a diagram of example components of a device 300. Device 300 may correspond to user device 210, process automation platform 220, and/or computing resource 225. In some implementations, user device 210, process automation platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
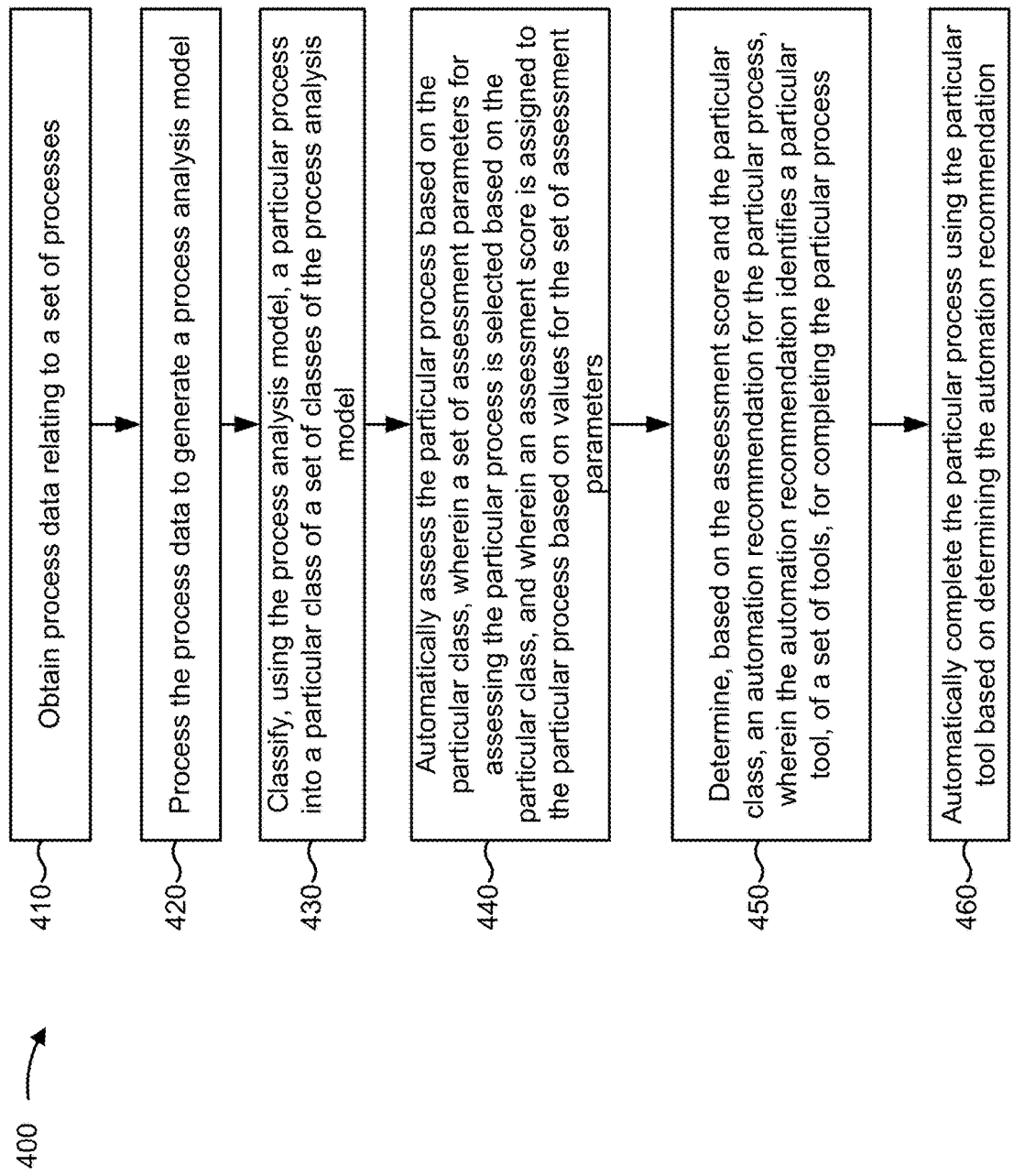
FIG. 4 is a flow chart of an example process for automated process analysis and automation implementation.

FIG. 4 is a flow chart of an example process 400 for automated process analysis and automation implementation. In some implementations, one or more process blocks of FIG. 4 may be performed by a process automation platform (e.g. process automation platform 220). In some implementations, one or more process blocks of FIG. 4 may be performed by another device or a group of devices separate from or including the process automation platform (e.g. process automation platform 220), such as a user device (e.g. user device 210) and a computing resource (e.g. computing resource 225).

As shown in FIG. 4, process 400 may include obtaining process data relating to a set of processes (block 410). For example, the process automation platform (e.g., using computing resource 225, processor 320, memory 330, storage component 340, input component 350, communication interface 370, and/or the like) may obtain process data relating to a set of processes, as described above in connection with FIGS. 1A-1D.

As further shown in FIG. 4, process 400 may include processing the process data to generate a process analysis model (block 420). For example, the process automation platform (e.g., using computing resource 225, processor 320, memory 330, storage component 340, and/or the like) may process the process data to generate a process analysis model, as described above in connection with FIGS. 1A-1D.

As further shown in FIG. 4, process 400 may include classifying, using the process analysis model, a particular process into a particular class of a set of classes of the process analysis model (block 430). For example, the process automation platform (e.g., using computing resource 225, processor 320, memory 330, storage component 340, and/or the like) may classify, using the process analysis model, a particular process into a particular class of a set of classes of the process analysis model, as described above in connection with FIGS. 1A-1D.

As further shown in FIG. 4, process 400 may include automatically assessing the particular process based on the particular class, wherein a set of assessment parameters for assessing the particular process is selected based on the particular class, wherein an assessment score is assigned to the particular process based on values for the set of assessment parameters (block 440). For example, the process automation platform (e.g., using computing resource 225, processor 320, memory 330, storage component 340, input component 350, communication interface 370, and/or the like) may automatically assess the particular process based on the particular class, as described above in connection with FIGS. 1A-1D. In some implementations, a set of assessment parameters for assessing the particular process is selected based on the particular class. In some implementations, an assessment score is assigned to the particular process based on values for the set of assessment parameters.

As further shown in FIG. 4, process 400 may include determining, based on the assessment score and the particular class, an automation recommendation for the particular process, wherein the automation recommendation identifies a particular tool, of a set of tools, for completing the particular process (block 450). For example, the process automation platform (e.g., using computing resource 225, processor 320, memory 330, storage component 340, and/or the like) may determine, based on the assessment score and the particular class, an automation recommendation for the particular process, as described above in connection with FIGS. 1A-1D. In some implementations, the automation recommendation identifies a particular tool, of a set of tools, for completing the particular process.

As further shown in FIG. 4, process 400 may include automatically completing the particular process using the particular tool based on determining the automation recommendation (block 460). For example, the process automation platform (e.g., using computing resource 225, processor 320, memory 330, storage component 340, input component 350, communication interface 370, and/or the like) may automatically complete the particular process using the particular tool based on determining the automation recommendation, as described above in connection with FIGS. 1A-1D.

Process 400 may include additional implementations, such as any single implementation or any combination of implementations described below and/or in connection with one or more other processes described elsewhere herein.

In some implementations, the process automation platform may generate, based on the process analysis model and the values for the set of assessment parameters, an automation maturity score representing a level of task automation weighted based on a set of questionnaire responses, and may determine the assessment score based on the automation maturity score. In some implementations, the process automation platform may determine an assessment questionnaire for the particular process based on the particular class, and may determine the values for the set of assessment parameters based on a set of responses for the assessment questionnaire. In some implementations, the process automation platform may generate a set of tool scores for the set of tools, wherein each tool score represents a suitability of each tool for completing the particular process, and may select the particular tool for completing the particular process based on the set of tool scores.

In some implementations, the process automation platform may process, using a natural language processing technique, a set of tool descriptions of the set of tools, and may select the particular tool for completing the particular process based on processing the set of tool descriptions, a process description for the particular process, and a class description for the particular class. In some implementations, the process automation platform may select the particular tool for completing the particular process based on a deep neural network model of process automation. In some implementations, the process automation platform may select the particular tool for completing the particular process based on a collaborative filtering technique applied to the set of tools. In some implementations, the process automation platform may select the particular tool for completing the particular process based on a content-based filtering technique applied to the set of tools.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
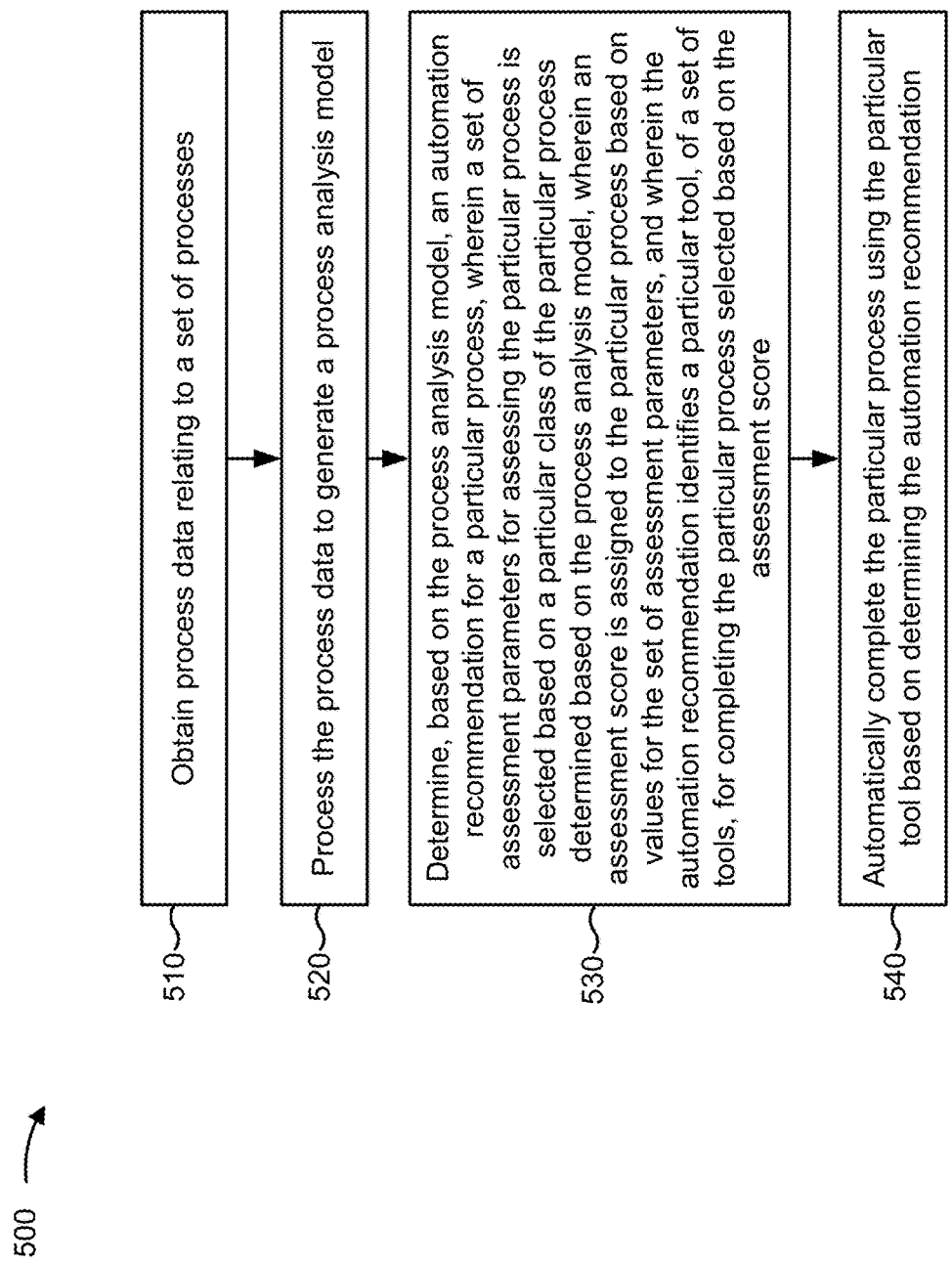
FIG. 5 is a flow chart of an example process for automated process analysis and automation implementation.

FIG. 5 is a flow chart of an example process 500 for automated process analysis and automation implementation. In some implementations, one or more process blocks of FIG. 5 may be performed by a process automation platform (e.g. process automation platform 220). In some implementations, one or more process blocks of FIG. 5 may be performed by another device or a group of devices separate from or including the process automation platform (e.g. process automation platform 220), such as a user device (e.g. user device 210) and a computing resource (e.g. computing resource 225).

As shown in FIG. 5, process 500 may include obtaining process data relating to a set of processes (block 510). For example, the process automation platform (e.g., using computing resource 225, processor 320, memory 330, storage component 340, input component 350, communication interface 370, and/or the like) may obtain process data relating to a set of processes, as described above in connection with FIGS. 1A-1D.

As further shown in FIG. 5, process 500 may include processing the process data to generate a process analysis model (block 520). For example, the process automation platform (e.g., using computing resource 225, processor 320, memory 330, storage component 340, input component 350, communication interface 370, and/or the like) may processing, by the device, the process data to generate a process analysis model, as described above in connection with FIGS. 1A-1D.

As further shown in FIG. 5, process 500 may include determining, based on the process analysis model, an automation recommendation for a particular process, wherein a set of assessment parameters for assessing the particular process is selected based on a particular class of the particular process determined based on the process analysis model, wherein an assessment score is assigned to the particular process based on values for the set of assessment parameters, and wherein the automation recommendation identifies a particular tool, of a set of tools, for completing the particular process selected based on the assessment score (block 530). For example, the process automation platform (e.g., using computing resource 225, processor 320, memory 330, storage component 340, and/or the like) may determine, based on the process analysis model, an automation recommendation for a particular process, as described above in connection with FIGS. 1A-1D. In some implementations, a set of assessment parameters for assessing the particular process is selected based on a particular class of the particular process determined based on the process analysis model. In some implementations, an assessment score is assigned to the particular process based on values for the set of assessment parameters. In some implementations, the automation recommendation identifies a particular tool, of a set of tools, for completing the particular process selected based on the assessment score.

As further shown in FIG. 5, process 500 may include automatically completing the particular process using the particular tool based on determining the automation recommendation (block 540). For example, the process automation platform (e.g., using computing resource 225, processor 320, memory 330, storage component 340, and/or the like) may automatically complete the particular process using the particular tool based on determining the automation recommendation, as described above in connection with FIGS. 1A-1D.

Process 500 may include additional implementations, such as any single implementation or any combination of implementations described below and/or in connection with one or more other processes described elsewhere herein.

In some implementations, the process automation platform may parse a set of questionnaire response documents to determine the process analysis model. In some implementations, the process automation platform may apply a set of weights to the set of assessment parameters based on the process analysis model. In some implementations, the process automation platform may determine the set of assessment parameters based on a set of sub-process areas determined for the particular process based on the process analysis model.

In some implementations, the process automation platform may determine that the particular tool can be applied to one or more tasks of the particular process based on the process analysis model without changes to the particular tool. In some implementations, the process automation platform may determine that the particular tool can be applied to one or more tasks of the particular process based on the process analysis model with less than a threshold level of changes to the particular tool, and may alter the particular tool to adapt the particular tool to the one or more tasks of the particular process. In some implementations, the process automation platform may determine a subset of the set of tools for the particular process, wherein each tool of the subset of the set of tools has a threshold assessment score, and may select the particular tool from the subset of the set of tools based on assessment scores of the subset of the set of tools. In some implementations, the process analysis model is at least one of: a collaborative filtering based model, or a content-based filter model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
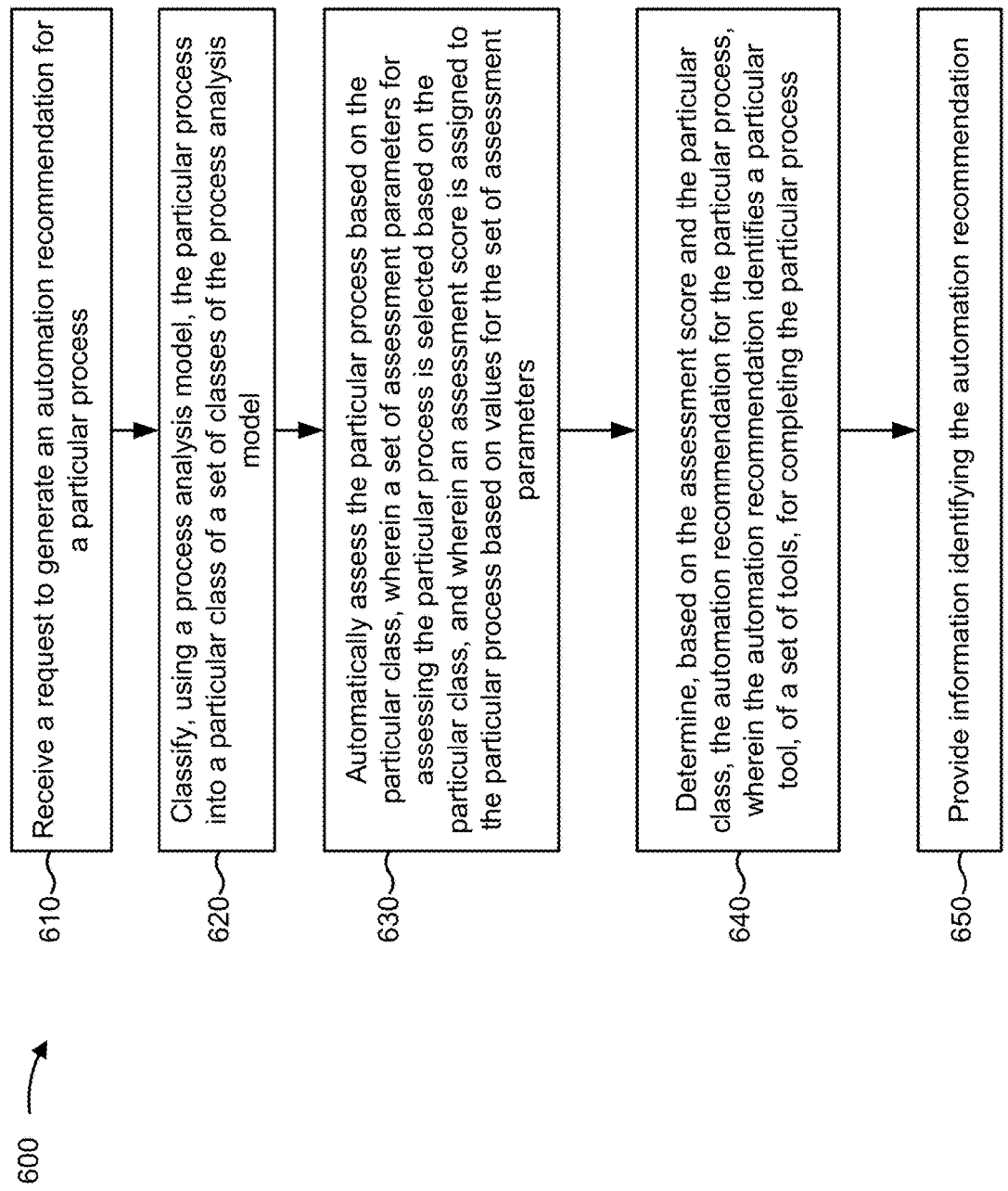
FIG. 6 is a flow chart of an example process for automated process analysis and automation implementation.

FIG. 6 is a flow chart of an example process 600 for automated process analysis and automation implementation. In some implementations, one or more process blocks of FIG. 6 may be performed by a process automation platform (e.g. process automation platform 220). In some implementations, one or more process blocks of FIG. 6 may be performed by another device or a group of devices separate from or including the process automation platform (e.g. process automation platform 220), such as a user device (e.g. user device 210) and a computing resource (e.g. computing resource 225).

As shown in FIG. 6, process 600 may include receiving a request to generate an automation recommendation for a particular process (block 610). For example, the process automation platform (e.g., using computing resource 225, processor 320, memory 330, storage component 340, input component 350, communication interface 370, and/or the like) may receive a request to generate an automation recommendation for a particular process, as described above in connection with FIGS. 1A-1D.

As further shown in FIG. 6, process 600 may include classifying, using a process analysis model, the particular process into a particular class of a set of classes of the process analysis model (block 620). For example, the process automation platform (e.g., using computing resource 225, processor 320, memory 330, storage component 340, and/or the like) may classify, using a process analysis model, the particular process into a particular class of a set of classes of the process analysis model, as described above in connection with FIGS. 1A-1D.

As further shown in FIG. 6, process 600 may include automatically assessing the particular process based on the particular class, wherein a set of assessment parameters for assessing the particular process is selected based on the particular class, and wherein an assessment score is assigned to the particular process based on values for the set of assessment parameters (block 630). For example, the process automation platform (e.g., using computing resource 225, processor 320, memory 330, storage component 340, and/or the like) may automatically assess the particular process based on the particular class, wherein a set of assessment parameters for assessing the particular process is selected based on the particular class, and wherein an assessment score is assigned to the particular process based on values for the set of assessment parameters, as described above in connection with FIGS. 1A-1D.

As further shown in FIG. 6, process 600 may include determining, based on the assessment score and the particular class, the automation recommendation for the particular process, wherein the automation recommendation identifies a particular tool, of a set of tools, for completing the particular process (block 640). For example, the process automation platform (e.g., using computing resource 225, processor 320, memory 330, storage component 340, and/or the like) may determine, based on the assessment score and the particular class, the automation recommendation for the particular process, as described above in connection with FIGS. 1A-1D. In some implementations, the automation recommendation identifies a particular tool, of a set of tools, for completing the particular process.

As further shown in FIG. 6, process 600 may include providing information identifying the automation recommendation (block 650). For example, the process automation platform (e.g., using computing resource 225, processor 320, memory 330, storage component 340, and/or the like) may provide information identifying the automation recommendation, as described above in connection with FIGS. 1A-1D.

Process 600 may include additional implementations, such as any single implementation or any combination of implementations described below and/or in connection with one or more other processes described elsewhere herein.

In some implementations, the process automation platform may automatically complete the particular process using the particular tool based on determining the automation recommendation. In some implementations, the particular process is at least one of: a service delivery process, a software engineering process, a software testing process, a development operations process, an agile process, an industry practices process, or a project management process. In some implementations, the process automation platform may provide a questionnaire relating to the particular process, where the questionnaire is selected based on a delivery type, a category, a process area, and a sub-process area for the particular process, may obtain a response to the questionnaire, and may parse the response to the questionnaire to obtain information regarding the particular process.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, process automation platform 220 reduces utilization of computing resources based on automatically classifying process data to reduce processing, reduces utilization of computing resources based on faster completion of a process, reduces utilization of computing resources and/or network resources based on decreasing a period of time where a device is using additional resources to complete a process manually, and/or the like. Furthermore, faster completion of a process improves user experience and minimizes time that a user may lose due to the process being manually completed. Furthermore, using the process analysis model to automatically select tools for automatically completing processes improves automation of process completion as a quantity of tools increases and/or a quantity of processes increases beyond what can be manually classified and manually completed.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   obtain process data relating to a set of processes;
   process the process data to generate a process analysis model;
   classify, using the process analysis model, a particular process into a particular class of a set of classes of the process analysis model;
   provide, to a user device and based on classifying the particular process, a process assessment user interface,
   the process assessment user interface including a set of automatically generated questionnaire questions for the particular process and one or more of:
   a scope of the particular process,
   a set of areas of the particular process, or
   automatically determined responses for the particular process;
   receive a set of responses from a user regarding a questionnaire question of the set of automatically generated questionnaire questions;
   automatically assess the particular process based on the particular class,
   wherein a set of assessment parameters for assessing the particular process is selected based on the particular class, and
   wherein an assessment score is assigned to the particular process based on values for the set of assessment parameters,
   wherein the values for the set of assessment parameters are determined based on the set of responses;
   generate, based on the process analysis model and the values for the set of assessment parameters, an automation maturity score representing a level of task automation weighted based on the set of responses,
   wherein the assessment score is based on the automation maturity score;
   determine, based on the assessment score and the particular class, an automation recommendation for the particular process,
   wherein the automation recommendation requires a particular tool, of a set of tools, for completing the particular process, and
   wherein the automation recommendation is displayed via the process assessment user interface;
   generate a set of tool scores for the set of tools,
   wherein each tool score, of the set of tool scores, represents a suitability of each tool for completing the particular process;
   select the particular tool for completing the particular process based on the set of tool scores in comparison to the automation recommendation; and
   automatically complete the particular process using the particular tool based on determining the automation recommendation.

2. The device of claim 1, wherein the one or more processors, when determining the automation recommendation, are to:
   process, using a natural language processing technique, a set of tool descriptions of the set of tools; and
   select the particular tool for completing the particular process based on processing the set of tool descriptions, a process description for the particular process, and a class description for the particular class.

3. The device of claim 1, wherein the one or more processors, when determining the automation recommendation, are to:
   select the particular tool for completing the particular process based on a deep neural network model of process automation.

4. The device of claim 1, wherein the one or more processors, when determining the automation recommendation, are to:

select the particular tool for completing the particular process based on a collaborative filtering technique applied to the set of tools.

5. The device of claim 1, wherein the one or more processors, when determining the automation recommendation, are to:
select the particular tool for completing the particular process based on a content-based filtering technique applied to the set of tools.

6. The device of claim 1, wherein the one or more processors are further to:
use the set of responses to determine whether a particular project is complying with the particular process.

7. A method, comprising:
obtaining, by a device, process data relating to a set of processes;
processing, by the device, the process data to generate a process analysis model;
providing, by the device, to a user device, and based on classifying a particular process using the process analysis model, a process assessment user interface,
the process assessment user interface including a set of automatically generated questionnaire questions for the particular process and one or more of:
a scope of the particular process,
a set of areas of the particular process, or
automatically determined responses for the particular process;
receiving, by the device, a set of responses from a user regarding a questionnaire question of the set of automatically generated questionnaire questions;
determining, by the device and based on the process analysis model, an automation recommendation for the particular process,
wherein a set of assessment parameters for assessing the particular process is selected based on a particular class of the particular process determined based on the process analysis model,
wherein an assessment score is assigned to the particular process based on values for the set of assessment parameters,
wherein the values for the set of assessment parameters are determined based on the set of responses,
wherein the automation recommendation requires a particular tool, of a set of tools, for completing the particular process selected based on the assessment score, and
wherein the automation recommendation is displayed via the process assessment user interface; and
generating, by the device and based on the process analysis model and the values for the set of assessment parameters, an automation maturity score representing a level of task automation weighted based on the set of responses,
wherein the assessment score is based on the automation maturity score;
generating, by the device, a set of tool scores for the set of tools,
wherein each tool score, of the set of tool scores, represents a suitability of each tool for completing the particular process;
selecting, by the device, the particular tool for completing the particular process based on the set of tool scores in comparison to the automation recommendation; and
automatically completing, by the device, the particular process using the particular tool based on determining the automation recommendation.

8. The method of claim 7, where processing the process data comprises:
parsing a set of questionnaire response documents associated with the set of responses to determine the process analysis model.

9. The method of claim 7, where processing the process data comprises:
applying a set of weights to the set of assessment parameters based on the process analysis model.

10. The method of claim 7, where processing the process data comprises:
determining the set of assessment parameters based on a set of sub-process areas determined for the particular process based on the process analysis model.

11. The method of claim 7, where determining the automation recommendation comprises:
determining that the particular tool can be applied to one or more tasks of the particular process based on the process analysis model without changes to the particular tool.

12. The method of claim 7, where determining the automation recommendation comprises:
determining that the particular tool can be applied to one or more tasks of the particular process based on the process analysis model with less than a threshold level of changes to the particular tool; and
altering the particular tool to adapt the particular tool to the one or more tasks of the particular process.

13. The method of claim 7, where determining the automation recommendation comprises:
determining a subset of the set of tools for the particular process,
wherein each tool of the subset of the set of tools has a threshold assessment score; and
selecting the particular tool from the subset of the set of tools based on assessment scores of the subset of the set of tools.

14. The method of claim 7, wherein the process analysis model is at least one of:
a collaborative filtering based model, or
a content-based filter model.

15. The method of claim 7, further comprising:
using the set of responses to determine whether a particular project is complying with the particular process.

16. A non-transitory computer-readable medium storing instructions, the instructions comprising:
one or more instructions that, when executed by one or more processors, cause the one or more processors to:
receive a request to generate an automation recommendation for a particular process;
classify, using a process analysis model, the particular process into a particular class of a set of classes of the process analysis model;
provide, to a user device and based on classifying the particular process, a process assessment user interface,
the process assessment user interface including a set of automatically generated questionnaire questions for the particular process and one or more of:
a scope of the particular process,
a set of areas of the particular process, or
automatically determined responses for the particular process;
receive a set of responses from a user regarding a questionnaire question of the set of automatically generated questionnaire questions;

automatically assess the particular process based on the particular class,
- wherein a set of assessment parameters for assessing the particular process is selected based on the particular class,
- wherein an assessment score is assigned to the particular process based on values for the set of assessment parameters, and
- wherein the values for the set of assessment parameters are determined based on the set of responses;

generate, based on the process analysis model and the values for the set of assessment parameters, an automation maturity score representing a level of task automation weighted based on the set of responses,
- wherein the assessment score is based on the automation maturity score;

determine, based on the assessment score and the particular class, the automation recommendation for the particular process,
- wherein the automation recommendation requires a particular tool, of a set of tools, for completing the particular process, and
- wherein the automation recommendation is displayed via the process assessment user interface; and generate a set of tool scores for the set of tools,
- wherein each tool score, of the set of tool scores, represents a suitability of each tool for completing the particular process;

select the particular tool for completing the particular process based on the set of tool scores in comparison to the automation recommendation; and provide information identifying the automation recommendation.

17. The non-transitory computer-readable medium of claim 16, wherein the one or more instructions, when executed by the one or more processors, further cause the one or more processors to:
- automatically complete the particular process using the particular tool based on determining the automation recommendation.

18. The non-transitory computer-readable medium of claim 16, wherein the particular process is at least one of:
- a service delivery process,
- a software engineering process,
- a software testing process,
- a development operations process,
- an agile process,
- an industry practices process,
- a process management process, or
- a project management process.

19. The non-transitory computer-readable medium of claim 16, wherein the one or more instructions, when executed by the one or more processors, further cause the one or more processors to:
- where the automatically generated questionnaire questions are selected based on a delivery type, a category, a process area, and a sub-process area for the particular process; and
- parse the set of responses to obtain information regarding the particular process.

20. The non-transitory computer-readable medium of claim 16, where the one or more instructions, when executed by the one or more processors, further cause the one or more processors to:
- use the set of responses to determine whether a particular project is complying with the particular process.

* * * * *